US008939241B2

(12) United States Patent
Tuttle et al.

(10) Patent No.: US 8,939,241 B2
(45) Date of Patent: Jan. 27, 2015

(54) FRONT MOUNTED AGRICULTURAL WORK VEHICLE POWER TAKEOFF SYSTEM

(75) Inventors: Thomas B. Tuttle, Naperville, IL (US); Edmund R. Henkel, Naperville, IL (US); Benjamin L. McCash, Willowbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 351 days.

(21) Appl. No.: 13/438,746

(22) Filed: Apr. 3, 2012

(65) Prior Publication Data

US 2013/0180346 A1 Jul. 18, 2013

Related U.S. Application Data

(60) Provisional application No. 61/586,012, filed on Jan. 12, 2012.

(51) Int. Cl.
*B60K 17/28* (2006.01)

(52) U.S. Cl.
USPC ........................................................ 180/53.8

(58) Field of Classification Search
CPC ................................ B60K 17/28; B60K 25/06
USPC ......... 180/53.1, 53.3, 53.7, 53.8; 74/11, 15.2, 74/15.4, 15.8, 15.82
See application file for complete search history.

(56) References Cited

U.S. PATENT DOCUMENTS

| 3,483,763 A | 12/1969 | Enters |
| RE27,177 E | 9/1971 | Schlapman et al. |
| 3,613,462 A | 10/1971 | Stibbe |
| 3,759,340 A * | 9/1973 | Schilter ........................ 180/53.7 |
| 4,525,987 A * | 7/1985 | Werner et al. ................... 56/15.2 |
| 4,618,016 A * | 10/1986 | van der Lely ................ 180/53.6 |
| 4,938,085 A | 7/1990 | Suzuki et al. |
| 4,982,799 A | 1/1991 | Fujimoto et al. |
| 5,099,937 A * | 3/1992 | McLean ........................ 180/53.3 |
| 5,152,357 A * | 10/1992 | McLean et al. ............... 180/53.3 |
| 5,299,821 A | 4/1994 | Hurlburt |
| 5,476,150 A | 12/1995 | Hurlburt et al. |
| 5,522,208 A * | 6/1996 | Wattron ......................... 56/15.1 |
| 6,089,340 A | 7/2000 | Galli |
| 6,237,708 B1 * | 5/2001 | Kawada ......................... 180/53.7 |
| 6,412,570 B1 * | 7/2002 | Pruitt et al. .................... 172/449 |
| 6,722,445 B2 | 4/2004 | Ohta et al. |
| 6,988,571 B2 | 1/2006 | Okamoto et al. |
| 8,256,198 B2 * | 9/2012 | Thompson ..................... 56/15.3 |
| 8,469,386 B2 * | 6/2013 | Clark et al. ................... 280/494 |
| 2005/0016304 A1 * | 1/2005 | Ishii et al. ...................... 74/15.4 |
| 2005/0161905 A1 * | 7/2005 | Chalancon et al. ........... 280/494 |
| 2007/0246270 A1 | 10/2007 | Priepke et al. |
| 2011/0232979 A1 | 9/2011 | Schulz et al. |

* cited by examiner

*Primary Examiner* — Paul N Dickson
*Assistant Examiner* — Robert A Coker
(74) *Attorney, Agent, or Firm* — Sue C. Watson

(57) ABSTRACT

A drive system for an agricultural work vehicle. The drive system includes a front power takeoff device configured to extend from a front portion of the agricultural work vehicle and to be driven by an engine. The drive system also includes a first gearbox and a second gearbox positioned between the engine and the front power takeoff device. The first gearbox is configured to be driven by the engine and to provide power to drive the second gearbox. The second gearbox is configured to be driven by the first gearbox and to provide power to drive the front power takeoff device. The first gearbox and the second gearbox each provide a vertical shift between a respective driven input and a respective driving output.

19 Claims, 5 Drawing Sheets

FRONT MOUNTED AGRICULTURAL WORK VEHICLE POWER TAKEOFF SYSTEM

RELATED APPLICATION

This application benefits from the priority of U.S. Provisional Patent Application No. 61/586,012, entitled "Front Mounted Agricultural Work Vehicle Power Takeoff System," filed Jan. 12, 2012, which is hereby incorporated by reference in its entirety.

BACKGROUND

The invention relates generally to agricultural work vehicles, such as tractors, and more particularly to a power takeoff system mounted to the front of an agricultural work vehicle.

A power takeoff system (e.g., drive system) generally uses energy from an engine to power devices attached to the power takeoff system. Agricultural work vehicles, such as tractors, may include one or more power takeoff systems. For example, an agricultural work vehicle may include a power takeoff system having a drive shaft extending from a rear end of the vehicle that provides a rotational output for operating an agricultural implement. In certain configurations, a power takeoff system may be mounted to a front end of an agricultural work vehicle for operating front mowers, stock choppers, rototillers, sugar beet toppers, and so forth.

Integrating a power takeoff system into the front end of an agricultural work vehicle may provide various challenges. For example, systems and devices, such as a cooling system, may be mounted in front of the engine, thereby blocking the path between an engine output shaft and a desired location of a power takeoff drive shaft. Further, such systems and devices may occupy a large amount of space near the engine, thereby limiting the locations in which a power takeoff system may be mounted. Likewise, the front axle of the agricultural work vehicle may further restrict the space available for the power takeoff system.

BRIEF DESCRIPTION

In one embodiment, a drive system for an agricultural work vehicle includes a front power takeoff device configured to extend from a front portion of the agricultural work vehicle, and to be driven by an engine. The drive system includes a first gearbox and a second gearbox positioned between the engine and the front power takeoff device. The first gearbox is configured to be driven by the engine and to provide power to drive the second gearbox. The second gearbox is configured to be driven by the first gearbox and to provide power to drive the front power takeoff device. The first gearbox and the second gearbox each provide a vertical shift between a respective driven input and a respective driving output.

In another embodiment, a drive system for an agricultural vehicle includes a first gearbox having a first plurality of gears. The first gearbox is configured to be driven by an engine coupled to a first driven input of the first gearbox. The drive system also includes a drive shaft coupled to a first driving output of the first gearbox, and configured to be driven by the first gearbox. The drive system includes a second gearbox having a second plurality of gears. The drive shaft is coupled to a second driven input of the second gearbox, and configured to drive the second gearbox. The drive system also includes a front power takeoff device configured to extend from a front portion of the agricultural work vehicle, to be driven by a second driving output of the second gearbox, and to drive an attachment coupled to the front power takeoff device. The first gearbox provides a first vertical shift between the first driven input and the first driving output, and the second gearbox provides a second vertical shift between the second driven input and the second driving output.

In another embodiment, a drive system for an agricultural work vehicle includes a drive shaft drivingly coupled to an engine output shaft of an engine via a first gearbox. The first gearbox is configured to be driven by the engine, and to transfer rotational energy to the drive shaft. The drive system also includes a front power takeoff device configured to extend from a front portion of the agricultural work vehicle. The front power takeoff device is drivingly coupled to the drive shaft via a second gearbox configured to be driven by the drive shaft, and to transfer rotational energy to the front power takeoff device. The first gearbox provides a first vertical shift between the engine output shaft and the drive shaft, and the second gearbox provides a second vertical shift between the drive shaft and the front power takeoff device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
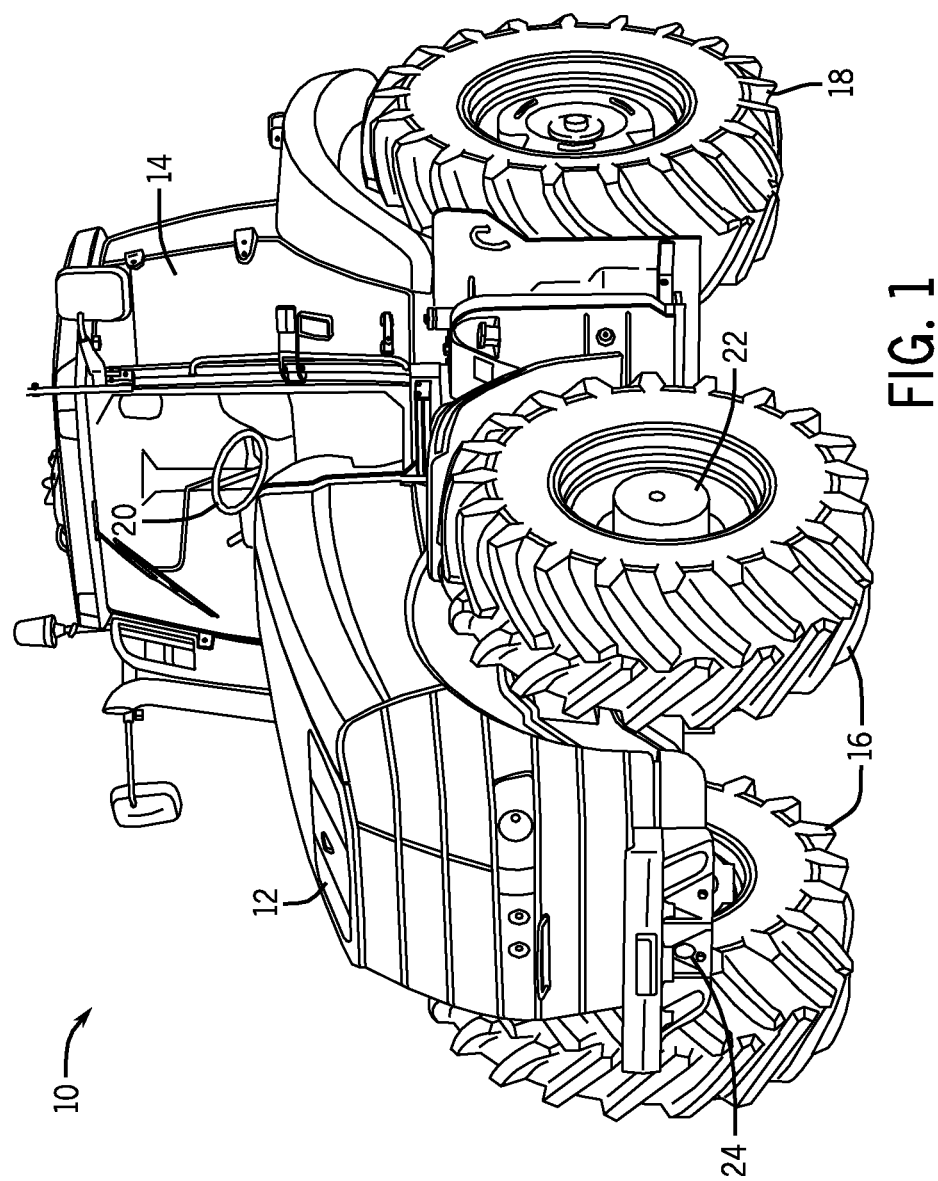
FIG. 1 is a perspective view of an embodiment of an agricultural work vehicle that may employ a front mounted power takeoff system in accordance with the present disclosure.

FIG. 1 is a perspective view of an exemplary agricultural work vehicle 10 that employs a front mounted power takeoff system. In certain embodiments, the agricultural work vehicle 10 may be a tractor, off-road vehicle, work vehicle, or any other suitable vehicle that may incorporate a front mounted power takeoff system. The illustrated vehicle 10 has a body 12 that houses an engine, transmission, cooling system, and power train (not separately shown). The body 12 may also house portions of the front mounted power takeoff system. Further, the agricultural work vehicle 10 has a cabin 14 where an operator may sit or stand to operate the vehicle 10. The vehicle 10 has two front wheels 16 and two rear wheels 18 that rotate to move the vehicle 10. As will be appreciated, the vehicle 10 is maneuvered using a steering wheel 20 that causes the front wheels 16 to turn. As illustrated, the wheels 16 are coupled to an axle 22 (e.g., fixed or suspended) that supports the wheels 16, and facilitates wheel rotation. As discussed in detail below, the front mounted power takeoff system may be routed within the body 12 and around various systems, such as a cooling system. A power takeoff output shaft 24 of the front mounted power takeoff system extends from the front of the agricultural work vehicle 10, and is used for driving moving parts of an implement coupled to the front of the agricultural work vehicle 10.

Figure 2:
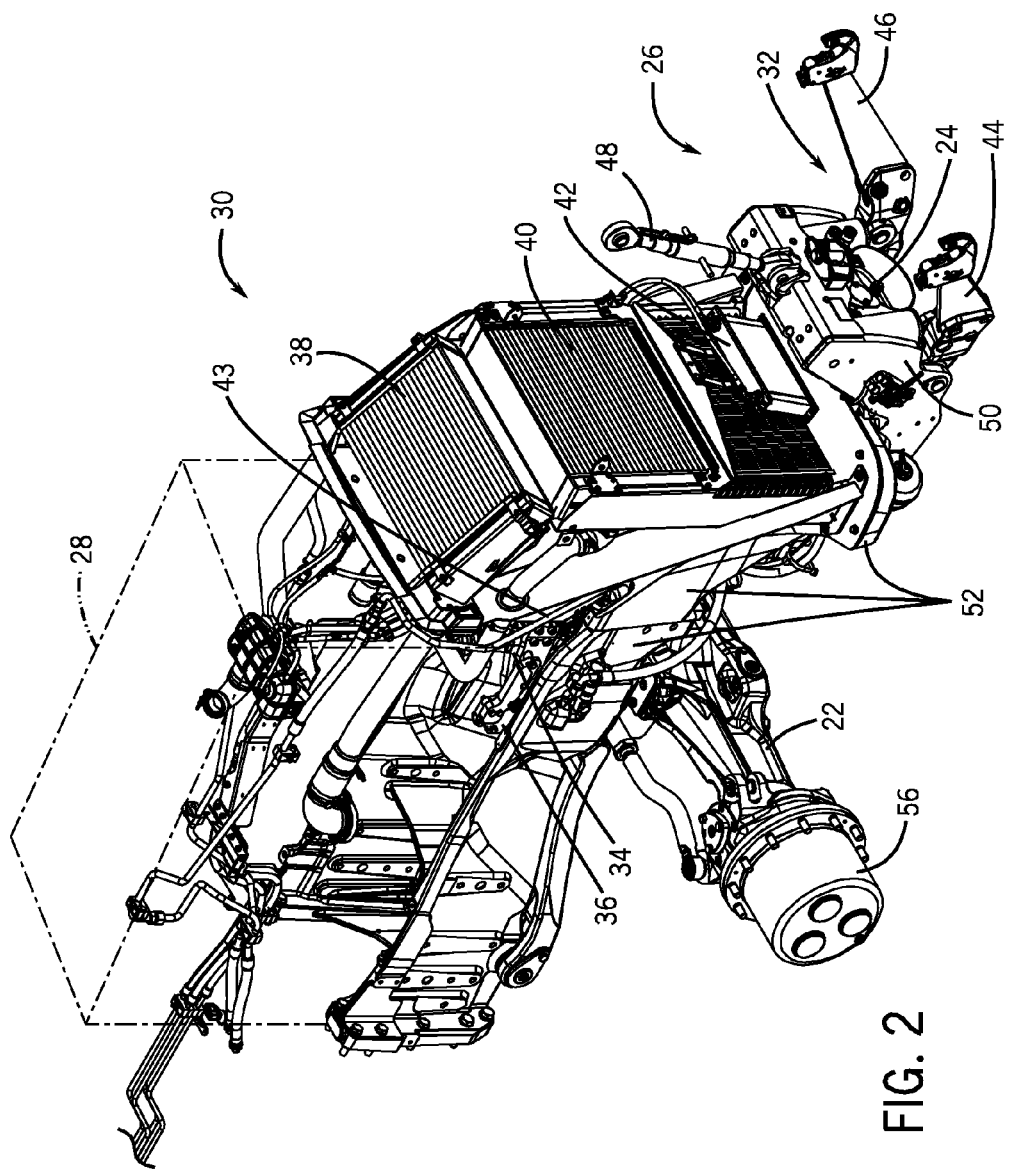
FIG. 2 is a perspective view of an embodiment of a front mounted power takeoff system mounted within an agricultural work vehicle in accordance with the disclosure.

FIG. 2 is a perspective view of a front mounted power takeoff (PTO) system 26 that may be mounted within the body 12 of the agricultural work vehicle 10. An engine 28, a cooling system 30, and portions of a hitch assembly 32 are also mounted within the body 12 of the agricultural work vehicle 10. The engine 28 provides power to the agricultural work vehicle 10, and drives the PTO system 26. In certain embodiments, the engine 28 may operate in the range of approximately 1800 rotations per minute (RPMs) to 2000 RPMs. The cooling system 30 is used to cool various parts of the agricultural work vehicle 10, such as the engine 28, the PTO system 26, and the transmission. Further, the hitch assembly 32 is used to attach agricultural implements to the front of agricultural work vehicle 10.

As discussed in detail below, the PTO system 26 includes a first gearbox 34, a second gearbox, and a drive shaft extending between the first gearbox 34 and the second gearbox. However, only the first gearbox 34 is visible in FIG. 2. The first gearbox 34 and the second gearbox each include multiple gears configure to reduce the rotational speed of the PTO output shaft 24 relative to the engine input. For example, the first gearbox 34 and the second gearbox may together provide a gear reduction that reduces a rotational speed of about 1800 RPM at the engine 28 to about 1000 RPM at the PTO output shaft 24. However, it should be appreciated that that the PTO system 26 may be configured to provide higher or lower gear reductions (or increased rotational speeds) in alternative embodiments. In the illustrated embodiment, the PTO system 26 is coupled to the engine 28. Specifically, a mounting plate 36 couples the gearbox 34 of the PTO system 26 to the engine 28. Further, the PTO system 26 extends vertically downward behind the cooling system 30, and then extends forwardly along a longitudinal direction from the bottom of the cooling system 30 toward the front of the agricultural work vehicle 10. Consequently, the PTO system establishes a path between the engine 28 and the PTO output shaft 24 at the front of the agricultural work vehicle 10.

As will be appreciated, the cooling system 30 may include multiple components that utilize a substantial portion of the available space within the agricultural work vehicle body 12. For example, the cooling system 30 may include multiple heat exchangers 38, 40, and 42. In certain embodiments, the heat exchangers 38, 40, and 42 may be used for cooling the transmission, the engine 28, the PTO system 26, and so forth. A fan 43 may be positioned behind the heat exchanger 38, 40, and 42 to induce an air flow across the heat exchangers 38, 40, and 42, and aid in transferring heat from the heat exchangers 38, 40, and 42 to the surrounding air.

The hitch assembly 32 includes hitch arms 44 and 46, and a top link 48. Together the hitch arms 44 and 46, and the top link 48 are used to attach an agricultural implement to the agricultural work vehicle 10. In the present embodiment, the hitch assembly 32 is mounted to the agricultural work vehicle 10 via a mounting structure 50. Further, as will be appreciated, multiple plates and mounting brackets 52 are also used to structurally support the engine 28, the PTO system 26, the cooling system 30, and the hitch assembly 32. As illustrated, the front axle 22 extends below a front portion of the engine 28. A hub 56 on each end of the axle 22 is used to attach the front wheels 16 to the agricultural work vehicle 10. In certain embodiments, the PTO output shaft 24 and the hitch assembly 32 are arranged to establish a desired clearance between the output/hitch assembly and the axle 22. Further, the PTO system 26 is routed around various systems in a manner that provides multiple vertical shifts. Thus, by using the PTO system 26, rotational energy may be transferred from the engine 28 to an implement coupled to the front of the agricultural work vehicle 10.

Figure 3:
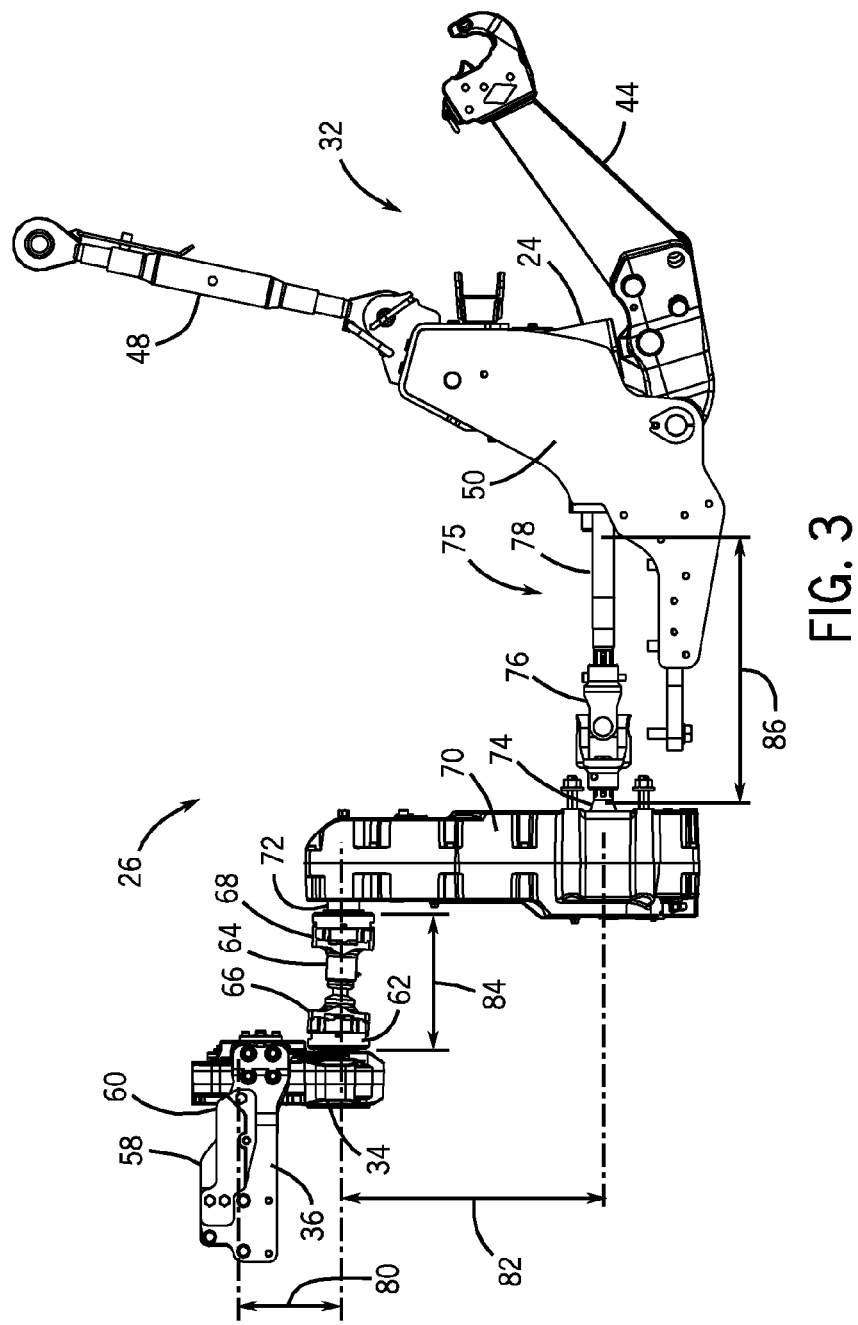
FIG. 3 is a detailed side view of the front mounted power takeoff system of FIG. 2.

FIG. 3 is a detailed perspective view of the front mounted PTO system 26 of FIG. 2. An engine output shaft 58 (i.e., engine output device) extends from the engine 28, and provides rotational energy to drive the first gearbox 34. In certain embodiments, the position of the engine output shaft 58 may be adjusted (e.g., to service an engine accessory belt). For example, in certain embodiments, an engine pulley may be adjacent to the first gearbox 34. The engine pulley may be used to drive an alternator, water pump, etc. Access to the engine pulley may be facilitated by adjusting the position of the engine output shaft 58. Specifically, the engine output shaft 58 is coupled to a first gearbox input 60. The first gearbox input 60 is rotationally driven by the engine output shaft 58, thereby inducing rotation of a first set of gears within the first gearbox 34. Rotation of the first set of gears within the first gearbox 34 drives a first gearbox output 62 to rotate, and thus provides a rotational energy output. In the present embodiment, the first set of gears within the first gearbox 34 provides a first gear reduction. However, it should be appreciated that the first set of gears may increase the rotational speed of the output 62 relative to the input 60 in alternative embodiments. Further, the first gearbox 34 provides a downward vertical shift between the engine output shaft 58 and a drive shaft 64 coupled to the first gearbox output 62. In certain embodiments, the first gearbox 34 may drive a fan or another accessory. As illustrated, a first coupling end 66 of the drive shaft 64 couples the drive shaft 64 to the first gearbox output 62. Therefore, rotation of the first gearbox output 62 drives the drive shaft 64 in rotation.

A second coupling end 68 of the drive shaft 64 couples the drive shaft 64 to a second gearbox 70. In particular, the second coupling end 68 of the drive shaft 64 couples the drive shaft 64 to a second gearbox input 72 of the second gearbox 70. The second gearbox input 72 is rotationally driven by the drive shaft 64, thereby driving a second set of gears within the second gearbox 70 in rotation. Rotation of the second set of gears within the second gearbox 70 drives a second gearbox output 74 to rotate, and provides a rotational energy output. In the present embodiment, the second set of gears within the second gearbox 70 provides a second gear reduction. In certain embodiments, the second gear reduction of the second gearbox 70 may be greater than the first gear reduction of the first gearbox 34. Further, it should be noted that the combination of the first gear reduction and the second gear reduction results in a rotational speed of the PTO output shaft 24 that is less than the engine rotational speed. For example, the output rotational speed of the PTO output shaft 24 may be approximately 900 RPM to 1000 RPM, while the engine rotational speed may be approximately 1800 RPM to 2000 RPM. However, it should be appreciated that the second gearbox 70 and/or the first gearbox 34 may be configured to increase rotational speed relative to the input speed. As illustrated, the second gearbox 70 provides a downward vertical shift between the drive shaft 64 and the PTO output shaft 24.

An output drive shaft 75 is coupled to the second gearbox output 74, and is driven to rotate by the second gearbox output 74. In the present embodiment, the output drive shaft 75 includes a coupling device 76, an output drive extension shaft 78, and the PTO output shaft 24. The coupling device 76 is coupled to the second gearbox output 74 and to the output drive extension shaft 78. The coupling device 76 and the output drive extension shaft 78 together enable rotational energy to be transferred from the second gearbox output 74 to the PTO output shaft 24. In certain embodiments, the first gearbox 34 and the second gearbox 70 may rotate the PTO output shaft 24 in a clockwise direction, while in other embodiments, the first gearbox 34 and the second gearbox 70 may rotate the PTO output shaft 24 in a counter clockwise direction. While the first and second gearboxes each employ a direction connection between gears to provide a variation in rotational speed, it should be appreciated that the gears in each gearbox may be linked via a chain in alternative embodiments.

As previously discussed, the first gearbox 34 provides a first downward vertical shift between the engine output shaft 58 and the drive shaft 64. The first downward vertical shift may be a vertical shift having a first height 80. Further, the second gearbox 70 provides a second downward vertical shift between the drive shaft 64 and the output drive shaft 75. The second downward vertical shift may be a vertical shift having a second height 82. In certain embodiments, the height 82 of the second downward vertical shift may be greater than the height 80 of the first downward vertical shift (e.g., by a factor of two or more). For example, the height 80 of the first downward vertical shift may be less than half the height 82 of the second downward vertical shift. Further, the drive shaft 64 may have a length 84 that is shorter than a length 86 of the output drive shaft 75. For example, the length 84 of the drive shaft 64 may be less than half the length 86 of the output drive shaft 75. In such a configuration, the PTO system 26 may be routed around the cooling system 30 and axle 22 of the agricultural work vehicle 10 using a two step vertical drop.

Figure 4:
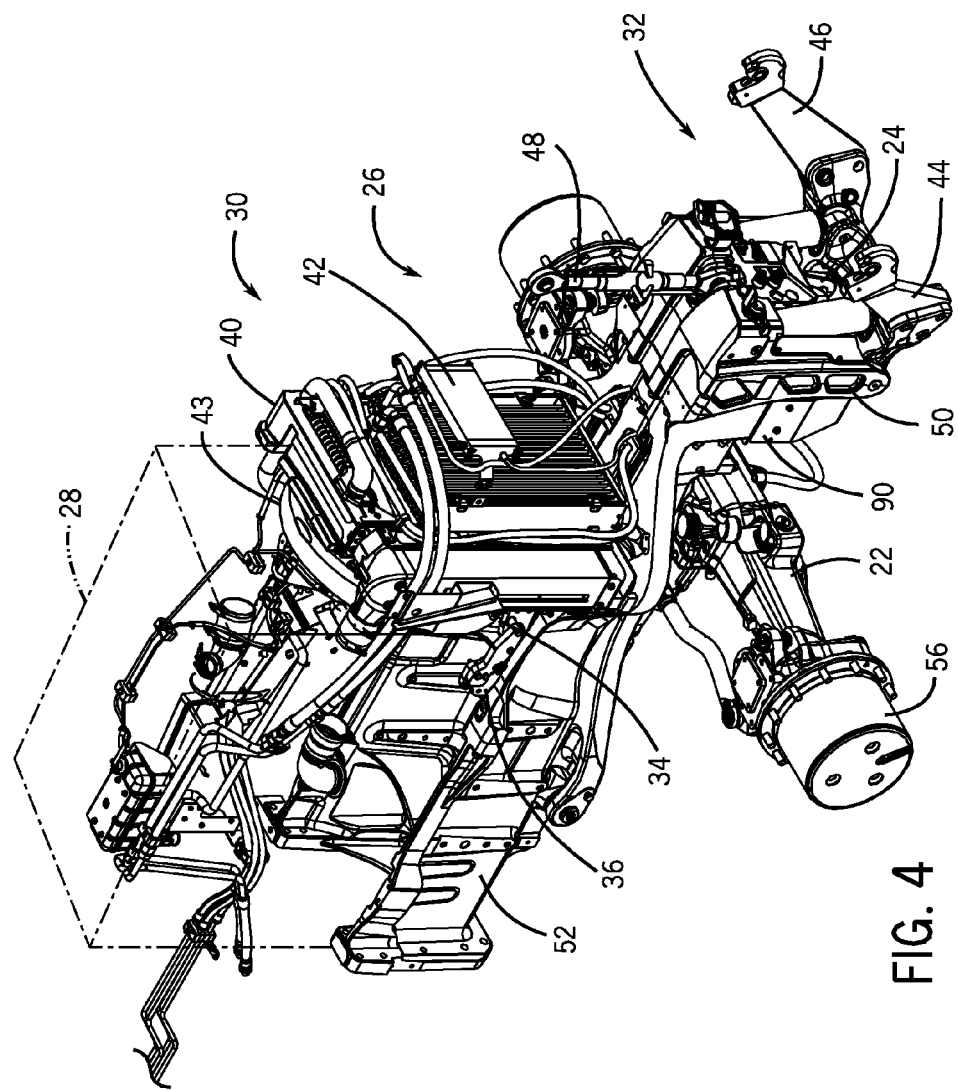
FIG. 4 is a perspective view of another embodiment of a front mounted power takeoff system mounted within an agricultural work vehicle in accordance with the disclosure.

FIG. 4 is a perspective view of another embodiment a front mounted PTO system 26 that may be mounted within the body 12 of the agricultural work vehicle 10. In this embodiment, the cooling system 30 occupies less space than the cooling system 30 of FIG. 2. In addition, the cooling system 30 does not extend as far longitudinally forward as the cooling system 30 of FIG. 2. As illustrated, the first gearbox 34 is coupled to the engine 28, and provides a first downward vertical drop. The PTO system 26 then extends between the cooling system 30 and the axle 22. Further, the PTO system 26 is routed through a tunnel in a mounting plate 90. After being routed through the tunnel, the second gearbox 70, which is mounted within the mounting structure 50, provides a second downward vertical drop such that the PTO output shaft 24 is positioned at a desired height for operating an implement attached to the agricultural work vehicle 10.

Figure 5:
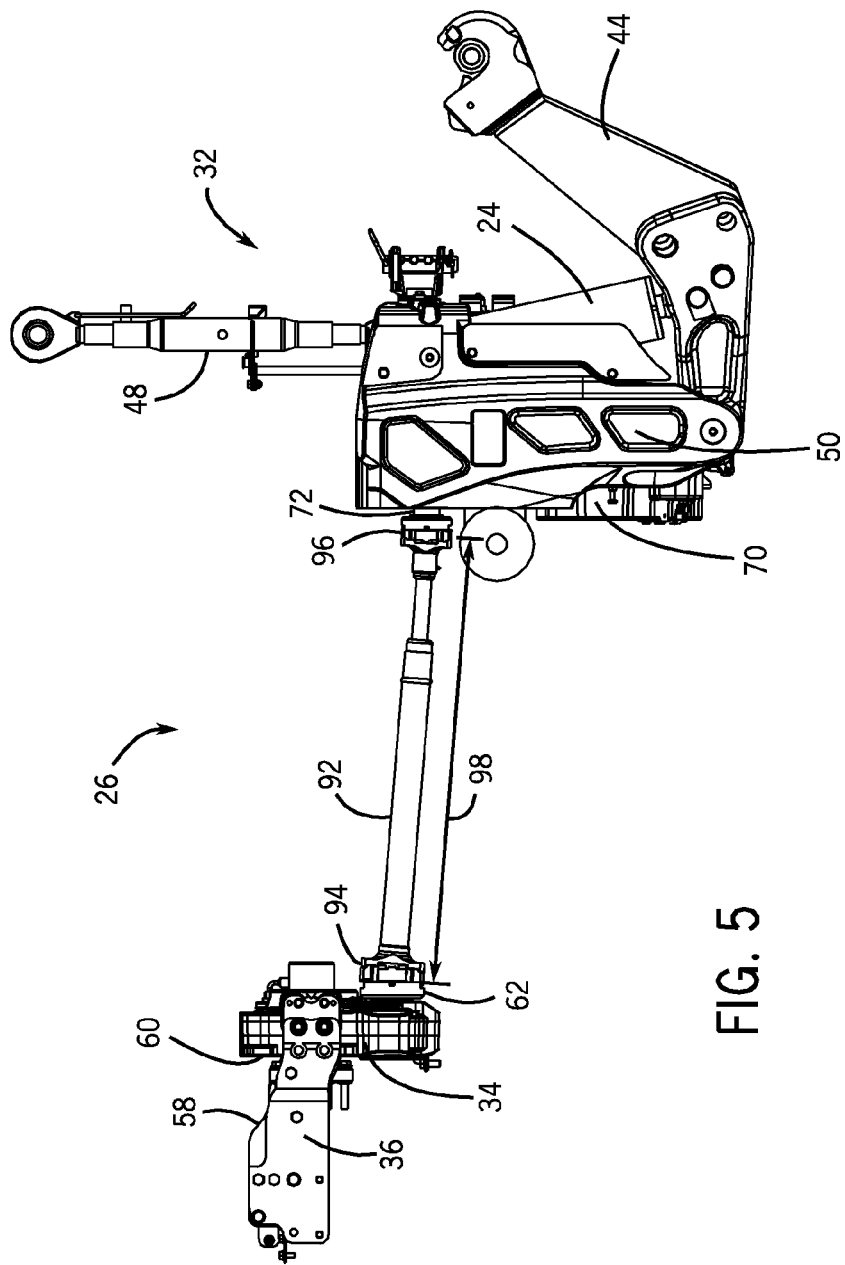
FIG. 5 is a detailed side view of the front mounted power takeoff system of FIG. 4.

FIG. 5 is a detailed perspective view of the front mounted PTO system 26 of FIG. 4. In the illustrated embodiment, a drive shaft 92 extends between the first gearbox 34 and the second gearbox 70. Specifically, a first coupling end 94 of the drive shaft 92 couples the drive shaft 92 to the first gearbox output 62. Further, a second coupling end 96 couples the drive shaft 92 to the second gearbox input 72. As the drive shaft 92 is rotated by the first gearbox output 62, the second gearbox input 72 is driven in rotation. When installed in the agricultural work vehicle 10, the drive shaft 92 extends through the tunnel in the mounting plate 90 as discussed in FIG. 4.

As illustrated, the second gearbox 70 is mounted within the mounting structure 50. Further, the PTO output shaft 24 extends through the mounting structure 50 to the front of the agricultural work vehicle 10. In addition, the hitch assembly 32 is coupled to the mounting structure 50, thereby facilitating attachment of an implement to the agricultural work vehicle 10. In certain embodiments, the drive shaft 92 may have a length 98 that is longer than the PTO output shaft 24 (e.g., front power takeoff device). Thus, the PTO system 26 is routed from the engine 28 to the first gearbox 34, which provides a first downward vertical drop. The PTO system 26 is then routed between the cooling system 30 and the axle 22, and through the tunnel in the mounting plate 90. Thereafter, the PTO system 26 includes a second downward vertical drop via the second gearbox 70. As such, the PTO system 26 is routed around the cooling system 30, and facilitates operation of an implement attached to the front of the agricultural work vehicle 10.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A drive system for an agricultural work vehicle comprising:
a front power takeoff device configured to extend from a front portion of the agricultural work vehicle, and to be driven by an engine; and
a first gearbox and a second gearbox positioned between the engine and the front power takeoff device, the first gearbox configured to be driven by the engine and to provide power to drive the second gearbox, the second gearbox configured to be driven by the first gearbox and to provide power to drive the front power takeoff device;
wherein the first gearbox and the second gearbox each provide a vertical shift between a respective driven input and a respective driving output.

2. The drive system of claim 1, wherein the first gearbox and the second gearbox are configured to reduce a first rotational speed of the front power takeoff device relative to a second rotational speed of the engine.

3. The drive system of claim 1, wherein the second gearbox provides a greater gear reduction than the first gearbox.

4. The drive system of claim 1, wherein the front power takeoff device is configured to extend beneath a cooling system of the agricultural work vehicle.

5. The drive system of claim 1, wherein the first gearbox provides a first downward vertical shift between the respective driven input and the respective driving output.

6. The drive system of claim 5, wherein the second gearbox provides a second downward vertical shift between the respective driven input and the respective driving output.

7. The drive system of claim 6, wherein the first downward vertical shift, the second downward vertical shift, or a combination thereof, enable an agricultural drive system to extend beneath a cooling system of the agricultural work vehicle.

8. The drive system of claim 1, comprising a plurality of brackets for mounting the first gearbox to the engine.

9. The drive system of claim 1, comprising a mounting structure on the front portion of the agricultural work vehicle, wherein the mounting structure is configured to support the second gearbox and a hitch assembly.

10. A drive system for an agricultural vehicle comprising:
a first gearbox configured to be driven by an engine coupled to a first driven input of the first gearbox;
a drive shaft coupled to a first driving output of the first gearbox, and configured to be driven by the first gearbox;
a second gearbox, the drive shaft coupled to a second driven input of the second gearbox, and configured to drive the second gearbox; and
a front power takeoff device configured to extend from a front portion of the agricultural work vehicle, to be driven by a second driving output of the second gearbox, and to drive an attachment coupled to the front power takeoff device;

wherein the first gearbox provides a first vertical shift between the first driven input and the first driving output, and the second gearbox provides a second vertical shift between the second driven input and the second driving output.

11. The drive system of claim 10, wherein the second vertical shift is greater than the first vertical shift.

12. The drive system of claim 11, wherein the second vertical shift is at least twice the first vertical shift.

13. The drive system of claim 10, wherein the drive shaft is shorter than a longitudinal extent of the front power takeoff device.

14. The drive system of claim 10, comprising a mounting structure on the front portion of the agricultural work vehicle, wherein the mounting structure is configured to support the second gearbox and a hitch assembly.

15. The drive system of claim 10, comprising a plurality of hitch arms coupled to a mounting structure on the front portion of the agricultural work vehicle, the front power takeoff device configured to extend at least partially through the mounting structure.

16. A drive system for an agricultural work vehicle comprising:

a drive shaft drivingly coupled to an engine output shaft of an engine via a first gearbox, the first gearbox configured to be driven by the engine, and to transfer rotational energy to the drive shaft; and a front power takeoff device configured to extend from a front portion of the agricultural work vehicle, the front power takeoff device drivingly coupled to the drive shaft via a second gearbox configured to be driven by the drive shaft, and to transfer rotational energy to the front power takeoff device;

wherein the first gearbox provides a first vertical shift between the engine output shaft and the drive shaft, and the second gearbox provides a second vertical shift between the drive shaft and the front power takeoff device.

17. The drive system of claim 16, wherein the first vertical shift is in a substantially downward direction.

18. The drive system of claim 17, wherein the second vertical shift is in the substantially downward direction.

19. The drive system of claim 18, wherein the first vertical shift, the second vertical shift, or a combination thereof, enable the agricultural drive system to extend beneath a cooling system of the agricultural work vehicle.

* * * * *